United States Patent
Cerny

(10) Patent No.: US 9,786,091 B2
(45) Date of Patent: *Oct. 10, 2017

(54) GRADIENT ADJUSTMENT FOR TEXTURE MAPPING TO NON-ORTHONORMAL GRID

(71) Applicant: Sony Interactive Entertainment America LLC, San Mateo, CA (US)

(72) Inventor: Mark Evan Cerny, Burbank, CA (US)

(73) Assignee: SONY INTERACTIVE ENTERTAINMENT AMERICA LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/351,310

(22) Filed: Nov. 14, 2016

(65) Prior Publication Data
US 2017/0061671 A1    Mar. 2, 2017

Related U.S. Application Data

(63) Continuation of application No. 14/246,068, filed on Apr. 5, 2014, now Pat. No. 9,495,790.

(51) Int. Cl.
| | |
|---|---|
| G06T 1/20 | (2006.01) |
| G06T 15/04 | (2011.01) |
| G06T 15/00 | (2011.01) |
| G06T 15/80 | (2011.01) |
| G06T 15/50 | (2011.01) |

(52) U.S. Cl.
CPC .............. G06T 15/04 (2013.01); G06T 1/20 (2013.01); G06T 15/005 (2013.01); G06T 15/80 (2013.01); *G06T 15/503* (2013.01); *G06T 2210/36* (2013.01)

(58) Field of Classification Search
CPC ........ G06T 1/20; G06T 15/04; G06T 2210/36
USPC .......................................................... 345/582
See application file for complete search history.

(56) References Cited

U.S. PATENT DOCUMENTS

| | | |
|---|---|---|
| 5,130,794 A | 7/1992 | Ritchey |
| 5,224,208 A | 6/1993 | Miller et al. |
| 5,422,653 A | 6/1995 | Maguire |
| 5,602,391 A | 2/1997 | Pines et al. |

(Continued)

FOREIGN PATENT DOCUMENTS

| | | |
|---|---|---|
| TW | I250785 B | 3/2006 |
| TW | 200919376 A | 5/2009 |
| TW | 201001329 A | 1/2010 |
| TW | 201143466 A | 12/2011 |

OTHER PUBLICATIONS

Final Office Action for U.S. Appl. No. 14/246,061, dated Jun. 17, 2016.

(Continued)

*Primary Examiner* — Jacinta M Crawford
(74) *Attorney, Agent, or Firm* — JDI Patent; Joshua D. Isenberg; Robert A. Pullman

(57) ABSTRACT

In a computer graphics processing unit (GPU) having a texture unit, when pixel sample locations are based on a non-orthonormal grid in scene space, the texture unit receives texture space gradient values directly, e.g., from a shader unit or generates them from texture coordinates supplied, e.g., by a shader unit, and then applies a transformation to the gradient values configured to adjust the gradient values to those which would arise from the use of a orthonormal screen space grid.

19 Claims, 5 Drawing Sheets

(56) References Cited

U.S. PATENT DOCUMENTS

| | | | |
|---|---|---|---|
| H1812 H | 11/1999 | Arcuri | |
| 6,313,838 B1 | 11/2001 | Deering | |
| 6,469,700 B1 | 10/2002 | Munshi et al. | |
| 6,731,298 B1* | 5/2004 | Moreton | G06T 11/001 345/582 |
| 6,804,066 B1 | 10/2004 | Ha et al. | |
| 6,967,663 B1 | 11/2005 | Bastos et al. | |
| 7,161,603 B2 | 1/2007 | Saito et al. | |
| 7,336,277 B1 | 2/2008 | Clark et al. | |
| 7,339,594 B1* | 3/2008 | Newhall, Jr. | G06T 11/001 345/582 |
| 7,426,724 B2 | 9/2008 | Kilgard et al. | |
| 7,511,717 B1 | 3/2009 | Bastos et al. | |
| 7,907,792 B2 | 3/2011 | Harville | |
| 7,916,155 B1 | 3/2011 | Moreton | |
| 8,090,383 B1 | 1/2012 | Emigh et al. | |
| 8,144,156 B1 | 3/2012 | Baldwin | |
| 8,233,004 B1 | 7/2012 | Molnar et al. | |
| 8,300,059 B2* | 10/2012 | Isidoro | G06T 15/04 345/582 |
| 8,581,929 B1 | 11/2013 | Maguire | |
| 8,669,999 B2 | 3/2014 | Donovan et al. | |
| 2003/0086603 A1 | 5/2003 | Davidson et al. | |
| 2003/0122833 A1 | 7/2003 | Doyle | |
| 2003/0234784 A1 | 12/2003 | Grzeszczuk et al. | |
| 2004/0036692 A1 | 2/2004 | Alcorn et al. | |
| 2005/0225670 A1 | 10/2005 | Wexler et al. | |
| 2006/0256112 A1 | 11/2006 | Heirich et al. | |
| 2006/0277520 A1 | 12/2006 | Gennari | |
| 2007/0018988 A1 | 1/2007 | Guthe | |
| 2007/0165035 A1 | 7/2007 | Duluk et al. | |
| 2007/0183649 A1 | 8/2007 | Kiefer et al. | |
| 2008/0062164 A1 | 3/2008 | Bassi et al. | |
| 2008/0106489 A1 | 5/2008 | Brown et al. | |
| 2008/0113792 A1 | 5/2008 | Yamada et al. | |
| 2008/0129748 A1 | 6/2008 | Bakalash et al. | |
| 2009/0141033 A1 | 6/2009 | Street | |
| 2010/0002000 A1 | 1/2010 | Everitt et al. | |
| 2010/0007662 A1 | 1/2010 | Cox et al. | |
| 2010/0104162 A1 | 4/2010 | Falk et al. | |
| 2010/0156919 A1 | 6/2010 | Bala et al. | |
| 2010/0214294 A1 | 8/2010 | Li et al. | |
| 2011/0902420 | 4/2011 | Frederiksen | |
| 2011/0134136 A1* | 6/2011 | Seiler | G06T 5/002 345/582 |
| 2011/0188744 A1 | 8/2011 | Sun | |
| 2011/0216069 A1 | 9/2011 | Keall et al. | |
| 2012/0014576 A1 | 1/2012 | Olson et al. | |
| 2012/0069021 A1 | 3/2012 | Son et al. | |
| 2012/0092366 A1 | 4/2012 | Smithers et al. | |
| 2012/0206452 A1 | 8/2012 | Geisner et al. | |
| 2012/0293486 A1 | 11/2012 | Adachi | |
| 2012/0293519 A1 | 11/2012 | Ribble et al. | |
| 2013/0021358 A1 | 1/2013 | Nordlund et al. | |
| 2013/0063440 A1 | 3/2013 | Son et al. | |
| 2013/0093766 A1 | 4/2013 | Hutchins et al. | |
| 2013/0114680 A1 | 5/2013 | Leontaris et al. | |
| 2013/0120380 A1 | 5/2013 | Kallio et al. | |
| 2013/0265309 A1 | 10/2013 | Goel et al. | |
| 2013/0300740 A1 | 11/2013 | Snyder et al. | |
| 2013/0342547 A1 | 12/2013 | Lum et al. | |
| 2014/0049549 A1 | 2/2014 | Lukyanov et al. | |
| 2014/0063016 A1 | 3/2014 | Howson et al. | |
| 2015/0089367 A1 | 3/2015 | Dodge et al. | |

OTHER PUBLICATIONS

Final Office Action for U.S. Appl. No. 14/246,062, dated Jul. 15, 2016.
Final Office Action for U.S. Appl. No. 14/246,063, dated Jun. 21, 2016.
Final Office Action for U.S. Appl. No. 14/246,064, dated Jul. 11, 2016.
Final Office Action for U.S. Appl. No. 14/246,066, dated Jul. 20, 2016.
Final Office Action for U.S. Appl. No. 14/246,067, dated Jun. 17, 2016.
International Search Report and Written Opinion for International Application No. PCT/US2015/024303, dated Jul. 1, 2015.
International Search Report and Written Opinion for International Application No. PCT/US2015/21951, dated Jul. 1, 2015.
International Search Report and Written Opinion for International Application No. PCT/US2015/21956, dated Jul. 1, 2015.
International Search Report and Written Opinion for International Application No. PCT/US2015/21971, dated Jul. 1, 2015.
International Search Report and Written Opinion for International Application No. PCT/US2015/21978, dated Jul. 1, 2015.
International Search Report and Written Opinion for International Application No. PCT/US2015/21984, dated Jul. 1, 2015.
International Search Report and Written Opinion for International Application No. PCT/US2015/21987, dated Jul. 1, 2015.
International Search Report and Written Opinion for International Application No. PCT/US201521982, dated Jul. 1, 2015.
John D. Owens, Mike Houston, David Luebke, Simon Green, John E. Stone, and James C. Phillips, "GPU Computing", Proceeding of IEEE, May 2008, p. 879-899.
Matthaus G. Chajdas, Morgan McGuire, David Luebke; "Subpixel Reconstruction Antialiasing for Deferred Shading" in i3D, Feb. 2011.
Non-Final Office Action for U.S. Appl. No. 14/246,061, dated Jan. 4, 2016.
Non-Final Office Action for U.S. Appl. No. 14/246,062, dated Jan. 14, 2016.
Non-Final Office Action for U.S. Appl. No. 14/246,063, dated Jan. 4, 2016.
Non-Final Office Action for U.S. Appl. No. 14/246,063, dated Nov. 23, 2016.
Non-Final Office Action for U.S. Appl. No. 14/246,064, dated Dec. 8, 2016.
Non-Final Office Action for U.S. Appl. No. 14/246,064, dated Feb. 1, 2015.
Non-Final Office Action for U.S. Appl. No. 14/246,066, dated Dec. 30, 2016.
Non-Final Office Action for U.S. Appl. No. 14/246,066, dated Feb. 5, 2016.
Non-Final Office Action for U.S. Appl. No. 14/246,067, dated Jan. 22, 2016.
Non-Final Office Action for U.S. Appl. No. 14/246,067, dated Oct. 27, 2016.
Non-Final Office Action for U.S. Appl. No. 14/246,068, dated Jan. 14, 2016.
Non-Final Office Action for U.S. Appl. No. 14/678,445, dated Dec. 30, 2016.
Non-Final Office Action for U.S. Appl. No. 14/246,061, dated Oct. 20, 2016.
Notice of Allowance for U.S. Appl. No. 14/246,062, dated Jan. 4, 2017.
Notice of Allowance for U.S. Appl. No. 14/246,068, dated Jul. 15, 2016.
Taiwan Office Action for TW Application No. 104108777, dated Jun. 27, 2016.
Taiwanese Office Action for TW Application No. 104108773, dated Dec. 22, 2015.
Taiwanese Office Action for TW Application No. 104108774, dated Sep. 12, 2016.
U.S. Appl. No. 14/246,061, to Tobias Berghoff, filed Apr. 5, 2014.
U.S. Appl. No. 14/246,062, to Mark Evan Cerny, filed Apr. 5, 2014.
U.S. Appl. No. 14/246,063, to Mark Evan Cerny, filed Apr. 5, 2014.
U.S. Appl. No. 14/246,064, to Tobias Berghoff, filed Apr. 5, 2014.
U.S. Appl. No. 14/246,067, to Tobias Berghoff, filed Apr. 5, 2014.
U.S. Appl. No. 14/246,068, to Mark Evan Cerny, filed Apr. 5, 2014.
U.S. Appl. No. 61/975,774, to Mark Evan Cerny, filed Apr. 5, 2014.
Non-final Office Action dated Aug. 24, 2017 for U.S. Appl. No. 14/246,061.
Non-Final Office Action for U.S. Appl. No. 15/587,825, dated Jun. 30, 2017.

(56) References Cited

OTHER PUBLICATIONS

Notice of Allowance dated Aug. 4, 2017 for U.S. Appl. No. 14/246,066.

* cited by examiner

- Actual sample location
- Desired sample location

XY space

UV space

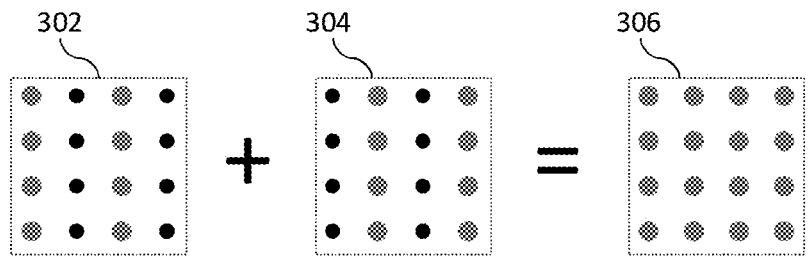
FIG. 3A
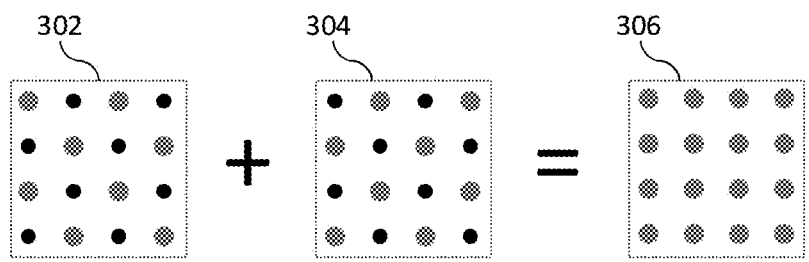
FIG. 3B
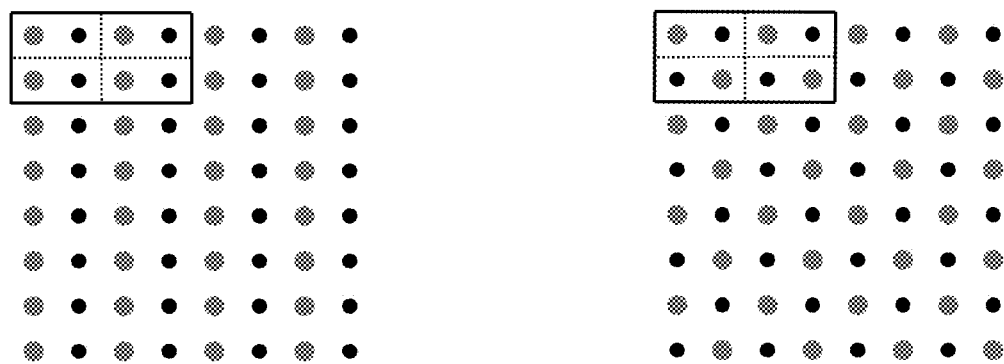
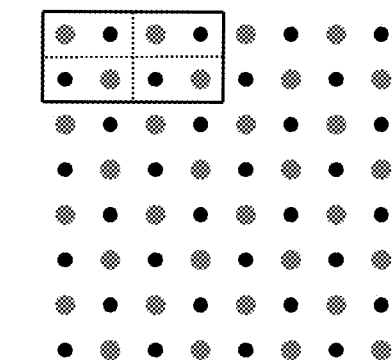
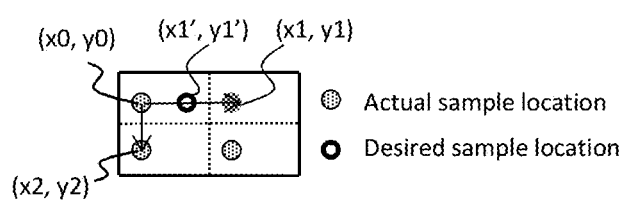
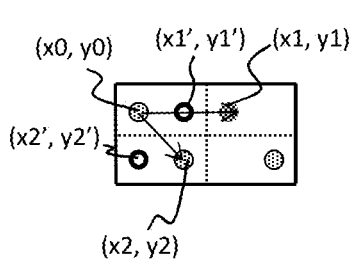
FIG. 4  FIG. 5

GRADIENT ADJUSTMENT FOR TEXTURE MAPPING TO NON-ORTHONORMAL GRID

CLAIM OF PRIORITY

This application is a continuation of U.S. patent application Ser. No. 14/246,068, to Mark Evan Cerny, filed Apr. 5, 2014, the entire contents of which are herein incorporated by reference.

CROSS-REFERENCE TO RELATED APPLICATIONS

This application is related to commonly-assigned, co-pending U.S. patent application Ser. No. 14/246,064, to Tobias Berghoff, entitled "METHOD FOR EFFICIENT CONSTRUCTION OF HIGH RESOLUTION DISPLAY BUFFERS", filed the same day as the present application, the entire contents of which are herein incorporated by reference.

This application is related to commonly-assigned, co-pending U.S. patent application Ser. No. 14/246,067, to Tobias Berghoff, entitled "GRAPHICS PROCESSING ENHANCEMENT BY TRACKING OBJECT AND/OR PRIMITIVE IDENTIFIERS", filed the same day as the present application, the entire contents of which are herein incorporated by reference.

This application is related to commonly-assigned, co-pending U.S. patent application Ser. No. 14/246,061, to Tobias Berghoff, entitled "VARYING EFFECTIVE RESOLUTION BY SCREEN LOCATION BY CHANGING ACTIVE COLOR SAMPLE COUNT WITHIN MULTIPLE RENDER TARGETS", filed the same day as the present application, the entire contents of which are herein incorporated by reference.

This application is related to commonly-assigned, co-pending U.S. patent application Ser. No. 14/246,063, to Mark Evan Cerny, entitled "VARYING EFFECTIVE RESOLUTION BY SCREEN LOCATION BY ALTERING RASTERIZATION PARAMETERS", filed the same day as the present application, the entire contents of which are herein incorporated by reference.

This application is related to commonly-assigned, co-pending U.S. patent application Ser. No. 14/246,066, to Mark Evan Cerny, entitled "VARYING EFFECTIVE RESOLUTION BY SCREEN LOCATION IN GRAPHICS PROCESSING BY APPROXIMATING PROJECTION OF VERTICES ONTO CURVED VIEWPORT", filed the same day as the present application, the entire contents of which are herein incorporated by reference.

This application is related to commonly-assigned, co-pending U.S. patent application Ser. No. 14/246,062, to Mark Evan Cerny, entitled "GRADIENT ADJUSTMENT FOR TEXTURE MAPPING FOR MULTIPLE RENDER TARGETS WITH RESOLUTION THAT VARIES BY SCREEN LOCATION", filed the same day as the present application, the entire contents of which are herein incorporated by reference.

FIELD OF THE DISCLOSURE

Aspects of the present disclosure are related to computer graphics. In particular, the present disclosure is related to adjustment of gradients used for texture mapping.

BACKGROUND

Graphics processing typically involves coordination of two processors, a central processing unit (CPU) and a graphics processing unit (GPU). The GPU is a specialized electronic circuit designed to accelerate the creation of images in a frame buffer intended for output to a display. GPUs are used in embedded systems, mobile phones, personal computers, tablet computers, portable game devices, workstations, and game consoles. A GPU is typically designed to be efficient at manipulating computer graphics. GPU's often have a highly parallel processing architecture that makes the GPU more effective than a general-purpose CPU for algorithms where processing of large blocks of data is done in parallel.

The CPU may send commands to the GPU to implement a particular graphics processing task, e.g. render a particular texture that has changed with respect to a previous frame in an image. These draw commands may be coordinated by the CPU with a graphics application interface (API) in order to issue graphics rendering commands that correspond to the state of the particular application's virtual environment.

In order to render textures for a particular program, a GPU may perform a series of processing tasks in a "graphics pipeline" to translate the visuals in the virtual environment into images that can be rendered onto a display. A typical graphics pipeline may include performing certain rendering or shading operations on virtual objects in the virtual space, transformation and rasterization of the virtual objects in the scene to produce pixel data suitable for output display, and additional rendering tasks on the pixels (or fragments) before outputting the rendered image on a display.

Virtual objects of an image are often described in virtual space in terms of shapes known as primitives, which together make the shapes of the objects in the virtual scene. For example, objects in a three-dimensional virtual world to be rendered may be reduced to a series of distinct triangle primitives having vertices defined in terms of their coordinates in three-dimensional space, whereby these polygons make up the surfaces of the objects. Each polygon may have an associated index that can be used by the graphics processing system to distinguish a given polygon from other polygons. Likewise, each vertex may have an associated index that can be used to distinguish a given vertex from other vertices. A graphics pipeline may perform certain operations on these primitives to produce visuals for the virtual scene and transform this data into a two-dimensional format suitable for reproduction by the pixels of the display. The term graphics primitive information (or simply "primitive information"), as used herein, is used to refer to data representative of a graphics primitive. Such data includes, but is not limited to, vertex information (e.g., data representing vertex positions or vertex indices) and polygon information, e.g., polygon indices and information that associates particular vertices with particular polygons.

A GPU may perform rendering tasks of the graphics pipeline by implementing programs commonly known as shaders. A typical graphics pipeline may include vertex shaders, which may manipulate certain properties of the primitives on a per-vertex basis, as well as pixel shaders (also known as "fragment shaders"), which operate downstream from the vertex shaders in the graphics pipeline and may manipulate certain values on a per-pixel basis before transmitting the pixel data to a display. The fragment shaders may manipulate values relevant to applying textures to primitives. The pipeline may also include other shaders at various stages in the pipeline, such as geometry shaders that use the output of the vertex shaders to generate a new set of primitives, as well as compute shaders (CS) which may implemented by a GPU to perform certain other general computational tasks.

Part of the process of mapping textures to primitives involves calculating gradients in texture space from pixel locations in screen space. The gradient calculation often assumes that the pixel locations are based on a square orthonormal grid.

It is within this context that the present disclosure arises.

BRIEF DESCRIPTION OF THE DRAWINGS

The teachings of the present disclosure can be readily understood by considering the following detailed description in conjunction with the accompanying drawings, in which:

FIGS. 3A-3B depict multiple render target (MRT) setups used in temporal antialiasing in accordance with aspects of the present disclosure.

FIGS. 4-5 depict multiple render target (MRT) setups used in temporal antialiasing in accordance with aspects of the present disclosure.

DESCRIPTION OF THE DRAWINGS

Figure 1A:
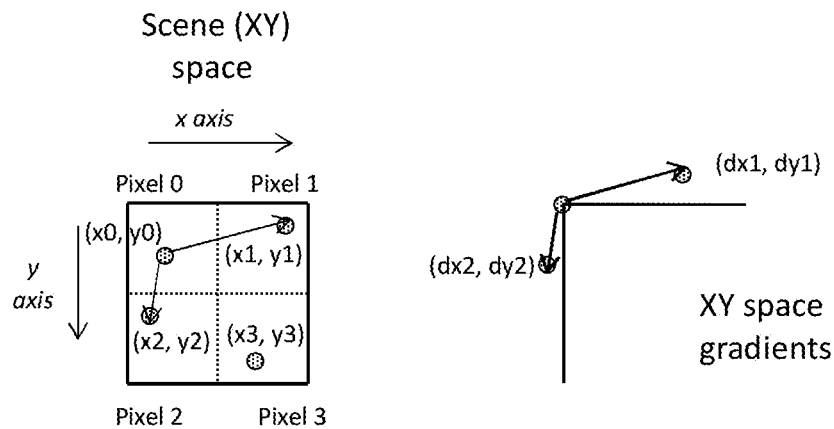
FIGS. 1A-1C depict conventional gradient transformations in applying textures.
Figure 1B:
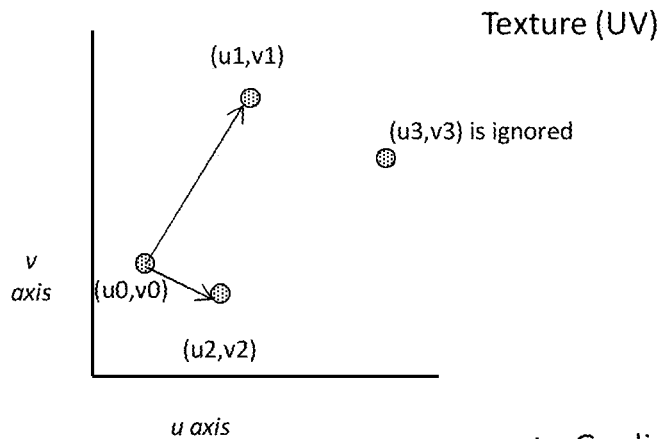
Figure 1C:
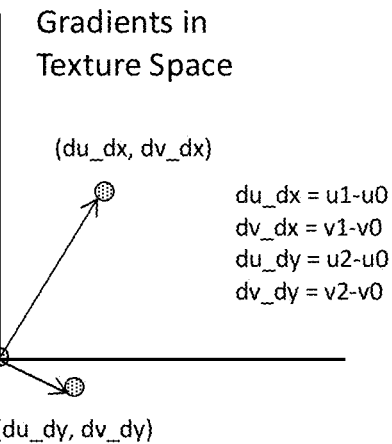

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

INTRODUCTION

In certain graphics applications bitmapped textures are "painted" onto the polygon. In such a case each pixel value drawn by the output device is determined from one or more pixels sampled from the texture. As used herein, a bitmap generally refers to a data file or structure representing a generally rectangular grid of pixels, or points of color, on a computer monitor, paper, or other display device. The color of each pixel is individually defined. For example, a colored pixel may be defined by three bytes—one byte each for red, green and blue. A bitmap typically corresponds bit for bit with data formats supported by device texture sampling units, which may typically include a range of options including various bit depths per channel or block compression, probably in the same format as it would be stored in the display's video memory or maybe as a device independent bitmap. A bitmap is characterized by the width and height of the image in pixels and the number of bits per pixel, which determines the number of colors it can represent. Though not commonly stored in bitmaps, many data formats overlap bit for bit with texturing formats. Some display formats aren't supported by texturing hardware (such as YUV) and some texturing formats aren't supported by display hardware (such as block compressed). Data formats that overlap include various bit-per-channel RGBA options.

The process of transferring a texture bitmap to a surface often involves the use of texture MIP maps (also known as mipmaps). The letters "MIP" in the name are an acronym of the Latin phrase multum in parvo, meaning "much in a small space". Such mipmaps are pre-calculated, optimized collections of bitmap images that accompany a main texture, intended to increase rendering speed and reduce aliasing artifacts.

Each bitmap image of the mipmap set is a version of the main texture, but at a certain reduced level of detail (LOD). Although the main texture would still be used when the view is sufficient to render it in full detail, the graphics hardware rendering the final image switches to a suitable mipmap level (or interpolates between the two nearest levels) when the texture is viewed from a distance, or at a small size. Rendering speed increases since the number of texture pixels ("texels") being processed can be much lower and their distribution in memory more coherent than with simple textures. Artifacts may be reduced since the mipmap images are effectively already anti-aliased, taking some of the burden off the real-time rendering hardware.

The blending between mipmap levels typically involves some form of texture filtering. As used herein, texture filtering refers to a method used to map texels (pixels of a texture) to points on a 3D object. A simple texture filtering algorithm may take a point on an object and look up the closest texel to that position. The resulting point then gets its color from that one texel. This simple technique is sometimes referred to as nearest neighbor filtering. More sophisticated techniques combine more than one texel per point. The most often used algorithms in practice are bilinear filtering and trilinear filtering using mipmaps. Anisotropic filtering and higher-degree methods, such as quadratic or cubic filtering, result in even higher quality images.

Textures are typically square and have side lengths equal to a power of 2. If, e.g., a texture has a basic size of 256 by 256 pixels, then the associated mipmap set may contain a series of 8 images, each half the size of the previous one: 128×128 pixels, 64×64, 32×32, 16×16, 8×8, 4×4, 2×2, and 1×1 (a single pixel). If, for example, this texture onto a 40×40 pixel portion of a screen space, then an interpolation of the 64×64 and the 32×32 mipmaps would be used. As used herein the term "screen space" refers generally to the set of coordinates used by the display buffer in the graphics pipeline.

The key operation in the process of determining the appropriate mipmap level involves determining the area covered in texture coordinate space (sometimes referred to as UV coordinate space) for a corresponding area of pixel locations from screen space (sometimes referred to as XY coordinate space). In general terms, screen space gradients of interpolated or computed texture UV coordinates are calculated from U and V values sampled at XY space pixel locations in the relevant portion of the scene. In some implementations, a texture coordinate gradient is determined for each screen space direction X and Y by calculating the change in texture coordinates occurring when the screen X coordinate changes and the screen Y is fixed (sometimes referred to as dU/dX, dV/dX), and the change in texture coordinates occurring when the screen Y coordinate changes and the screen X is fixed (sometimes referred to as dU/dY, dV/dY). For non-anisotropic texture lookups, the gradient with the larger magnitude among these two is used to select level of detail (LOD). For anistropic texturing, the smaller magnitude gradient is used to select the (LOD), and the texture is sampled in a line corresponding to the larger magnitude gradient.

Also note that the above calculation can be generalized to 1, 2, 3, or more texture coordinate dimensions. Typical hardware calculates a 1D gradient in U-space or a 2D gradient in UV-space or a 3D gradient in UVW-space depending on the texture dimensionality. Thus, aspects of the present disclosure are not limited to implementations involving two texture coordinate dimensions.

The process of determining the appropriate mipmap level is, however, based on an assumption that the relevant portion of the screen space onto which the texture to be applied is a "square" orthonormal arrangement of samples, i.e., the sample points within screen pixels are evenly spaced in the vertical and horizontal directions in the screen space. However, situations can arise where the relevant portion of the screen space is non-orthonormal, i.e., the samples are not arranged in a regular square grid. In such situations, the gradients must be adjusted so that the textures are applied properly to the object.

System and Apparatus

Figure 6A:
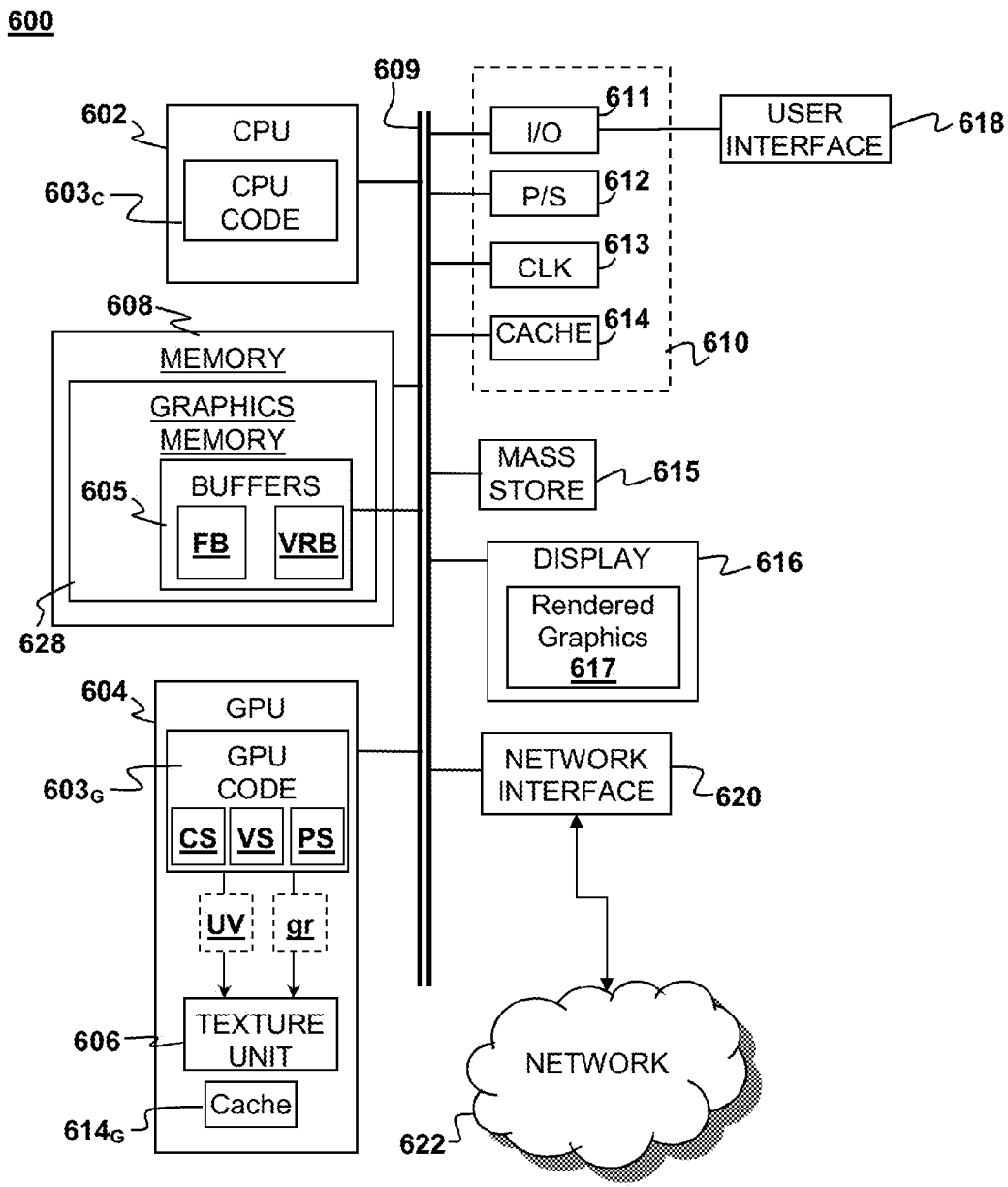
FIG. 6A is a block diagram of a graphics processing system in accordance with aspects of the present disclosure.

Aspects of the present disclosure include graphics processing systems that are configured to implement gradient adjustment in texture mapping. By way of example, and not by way of limitation, FIG. 6A illustrates a block diagram of a computer system 600 that may be used to implement graphics processing according to aspects of the present disclosure. According to aspects of the present disclosure, the system 600 may be an embedded system, mobile phone, personal computer, tablet computer, portable game device, workstation, game console, and the like.

The system 600 generally may include a central processor unit (CPU) 602, a graphics processor unit (GPU) 604, and a memory 608 that is accessible to both the CPU and GPU. The CPU 602 and GPU 604 may each include one or more processor cores, e.g., a single core, two cores, four cores, eight cores, or more. The memory 608 may be in the form of an integrated circuit that provides addressable memory, e.g., RAM, DRAM, and the like. The memory 608 may include graphics memory 628 that may store graphics resources and temporarily store graphics buffers 605 of data for a graphics rendering pipeline. The graphics buffers 605 may include, e.g., vertex buffers for storing vertex parameter values, index buffers for holding vertex indices, depth buffers (e.g., Z-buffers) for storing depth values of graphics content, stencil buffers, frame buffers for storing completed frames to be sent to a display, and other buffers. In the example shown in FIG. 6A, the graphics memory 628 is shown as part of the main memory. In alternative implementations, the graphics memory could be a separate component, possibly integrated into the GPU 604.

By way of example, and not by way of limitation, the CPU 602 and GPU 604 may access the memory 608 using a data bus 609. In some cases, it may be useful for the system 600 to include two or more different buses. The memory 608 may contain data that can be accessed by the CPU 602 and GPU 604. The GPU 604 may include a plurality of compute units configured to perform graphics processing tasks in parallel. Each compute unit may include its own dedicated local memory store, such as a local data share.

The CPU may be configured to execute CPU code $603_C$, which may include an application that utilizes graphics, a compiler and a graphics API. The graphics API can be configured to issue draw commands to programs implemented by the GPU. The CPU code $603_C$ may also implement physics simulations and other functions. The GPU 604 may be configured to operate as discussed above. In particular, the GPU may execute GPU code $603_G$, which may implement shaders, such as compute shaders CS, vertex shaders VS, and pixel shaders PS, as discussed above. To facilitate passing of data between the compute shaders CS and the vertex shaders VS the system may include one or more ring buffers 605, which may include a frame buffer FB. The GPU code $603_G$ may also optionally implement other types of shaders (not shown), such as pixel shaders or geometry shaders. Each compute unit may include its own dedicated local memory store, such as a local data share. The GPU 604 may include a texture unit 606 configured to perform certain operations for applying textures to primitives as part of a graphics pipeline.

The shaders may include a pixel shader PS configured to receive or generate one or more sets of texture coordinate values UV and potentially also texture space gradient values for each coordinate gr, for one or more corresponding pixel sample locations based on a non-orthonormal grid in a screen space. These pixel sample locations may be derived from one or more primitives defined at an earlier stage in the graphics pipeline. The texture unit 606 is configured to receive these texture space gradient values gr or to calculate them from the texture coordinate values UV, and then to apply the adjustment matrix trans to obtain adjusted gradient values Gr that are largely free from aliasing artifacts arising from the usage of a non-orthonormal screen space grid of pixel sample locations.

By way of example, and not by way of limitation, the texture unit 606 may be implemented as special purpose hardware, such as an application-specific integrated circuit (ASIC), Field Programmable Gate Array (FPGA), or a system on chip (SoC or SOC).

As used herein and as is generally understood by those skilled in the art, an application-specific integrated circuit (ASIC) is an integrated circuit customized for a particular use, rather than intended for general-purpose use.

As used herein and as is generally understood by those skilled in the art, a Field Programmable Gate Array (FPGA) is an integrated circuit designed to be configured by a customer or a designer after manufacturing—hence "field-programmable". The FPGA configuration is generally specified using a hardware description language (HDL), similar to that used for an ASIC.

As used herein and as is generally understood by those skilled in the art, a system on a chip or system on chip (SoC or SOC) is an integrated circuit (IC) that integrates all components of a computer or other electronic system into a single chip. It may contain digital, analog, mixed-signal, and often radio-frequency functions—all on a single chip substrate. A typical application is in the area of embedded systems.

A typical SoC includes the following hardware components:
  One or more processor cores (e.g., microcontroller, microprocessor or digital signal processor (DSP) cores.
  Memory blocks, e.g., read only memory (ROM), random access memory (RAM), electrically erasable programmable read-only memory (EEPROM) and flash memory.
  Timing sources, such as oscillators or phase-locked loops.
  Peripherals, such as counter-timers, real-time timers, or power-on reset generators.
  External interfaces, e.g., industry standards such as universal serial bus (USB),
  FireWire, Ethernet, universal asynchronous receiver/transmitter (USART), serial peripheral interface (SPI) bus.
  Analog interfaces including analog to digital converters (ADCs) and digital to analog converters (DACs).
  Voltage regulators and power management circuits.

These components are connected by either a proprietary or industry-standard bus. Direct Memory Access (DMA) controllers route data directly between external interfaces and memory, bypassing the processor core and thereby increasing the data throughput of the SoC.

A typical SoC includes both the hardware components described above, and executable instructions (e.g., software or firmware) that controls the processor core(s), peripherals and interfaces.

According to aspects of the present disclosure, some or all of the functions of the texture unit 606 may alternatively be implemented by appropriately configured software instructions executed by a software programmable general purpose computer processor. Such instructions may be embodied in a computer-readable medium, e.g., memory 608 or storage device 615.

The system 600 may also include well-known support functions 610, which may communicate with other components of the system, e.g., via the bus 609. Such support functions may include, but are not limited to, input/output (I/O) elements 611, power supplies (P/S) 612, a clock (CLK) 613 and cache 614. In addition to the cache 614, the GPU 604 may include its own GPU cache $614_G$, and the GPU may be configured so that programs running on the GPU 604 can read-through or write-though the GPU cache $614_G$.

The system 600 may optionally include a mass storage device 615 such as a disk drive, CD-ROM drive, flash memory, tape drive, or the like to store programs and/or data. The system 600 may also optionally include a display device 616 to present rendered graphics 617 to a user and user interface unit 618 to facilitate interaction between the system 600 and a user. The display device 616 may be in the form of a flat panel display, head mounted display (HMD), cathode ray tube (CRT) screen, projector, or other device that can display visible text, numerals, graphical symbols or images. The display device 616 may display rendered graphic images 617 processed in accordance with various techniques described herein. The user interface 618 may include a keyboard, mouse, joystick, light pen, game controller, or other device that may be used in conjunction with a graphical user interface (GUI). The system 600 may also include a network interface 620 to enable the device to communicate with other devices over a network 622. The network 622 may be, e.g., a local area network (LAN), a wide area network such as the internet, a personal area network, such as a Bluetooth network or other type of network. These components may be implemented in hardware, software, or firmware, or some combination of two or more of these.

Graphics Pipeline

Figure 6B:
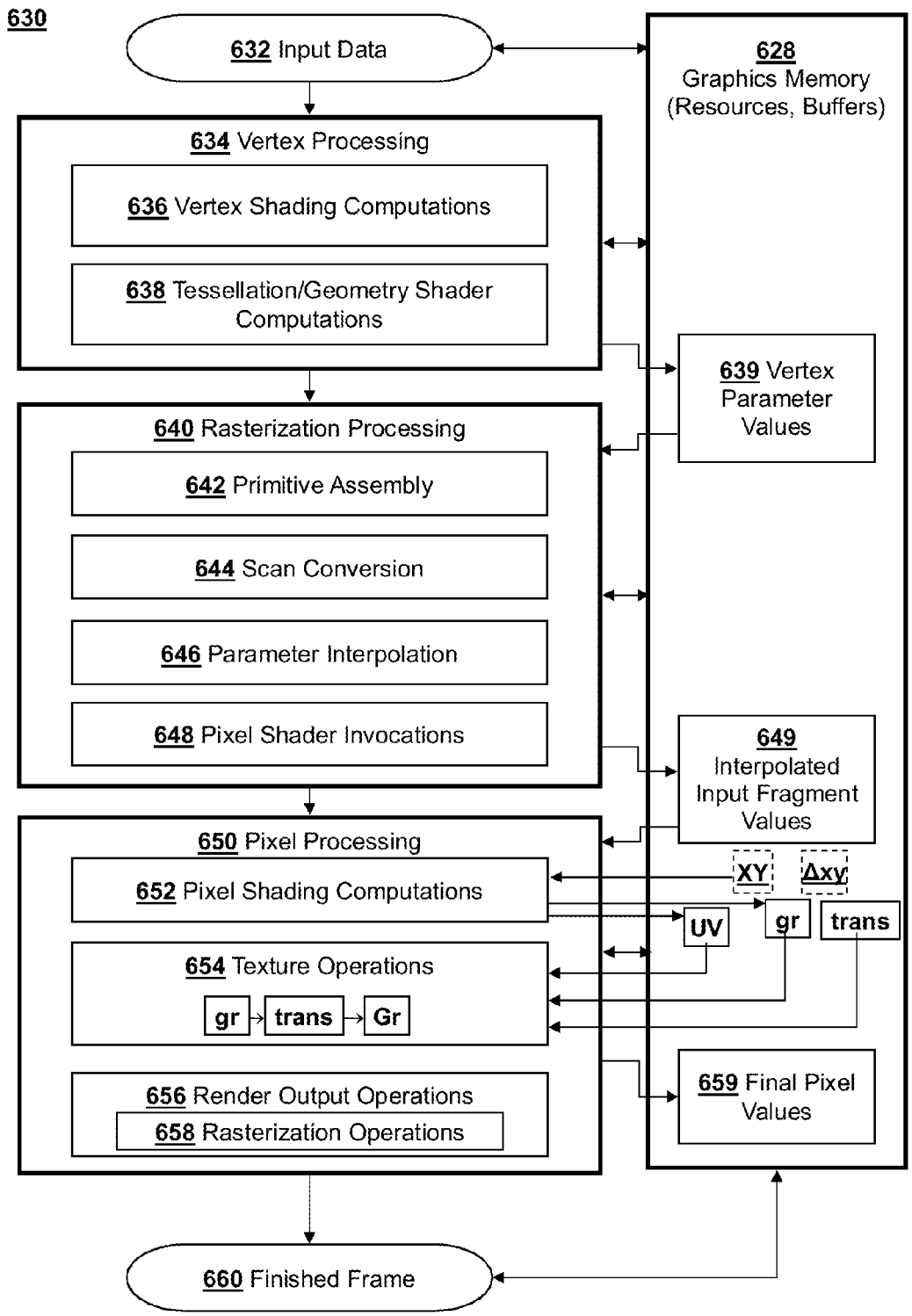
FIG. 6B is a block diagram of a graphics processing pipeline.

According to aspects of the present disclosure, the system 600 is configured to implement portions of a graphics rendering pipeline. FIG. 6B illustrates an example of a graphics rendering pipeline 630 in accordance with aspects of the present disclosure.

The rendering pipeline 630 may be configured to render graphics as images that depict a scene having a two-dimensional or preferably three-dimensional geometry in virtual space (sometime referred to herein as "world space"). The early stages of the pipeline may include operations performed in virtual space before the scene is rasterized and converted to screen space as a set of discrete picture elements suitable for output on the display device 616. Throughout the pipeline, various resources contained in the graphics memory 628 may be utilized at the pipeline stages and inputs and outputs to the stages may be temporarily stored in buffers contained in the graphics memory before the final values of the images are determined.

The rendering pipeline may operate on input data 632, which may include one or more virtual objects defined by a set of vertices that are set up in virtual space and have geometry that is defined with respect to coordinates in the scene. The early stages of the pipeline may include what is broadly categorized as a vertex processing stage 634 in FIG. 6B, and this may include various computations to process the vertices of the objects in virtual space. This may include vertex shading computations 636, which may manipulate various parameter values of the vertices in the scene, such as position values (e.g., X-Y coordinate and Z-depth values), color values, lighting values, texture coordinates, and the like. Preferably, the vertex shading computations 636 are performed by one or more programmable vertex shaders. The vertex processing stage may optionally include additional vertex processing computations, such as tessellation and geometry shader computations 638 which may be optionally used to generate new vertices and new geometries in virtual space. Once the stage referred to as vertex processing 634 is complete, at this stage in the pipeline the scene is defined by a set of vertices which each have a set of vertex parameter values 639.

The pipeline 630 may then proceed to rasterization processing stages 640 associated with converting the scene geometry into screen space and a set of discrete picture elements, i.e., pixels. The virtual space geometry may be transformed to screen space geometry through operations that may essentially compute the projection of the objects and vertices from virtual space to the viewing window (or "viewport) of the scene. The vertices may define a set of primitives.

The rasterization processing stage 640 depicted in FIG. 6B may include primitive assembly operations 642, which may set up the primitives defined by each set of vertices in the scene. Each vertex may be defined by an index, and each primitive may be defined with respect to these vertex indices, which may be stored in index buffers in the graphics memory 628. The primitives may preferably include at least triangles defined by three vertices each, but may also include point primitives line primitives, and other polygonal shapes. During the primitive assembly stage 642, certain primitives may optionally be culled. For example, those primitives whose indices indicate a certain winding order may be considered to be back-facing and may be culled from the scene.

After primitives are assembled, the rasterization processing stages may include scan conversion operations 644, which may sample the primitives at each pixel and generate fragments (sometimes referred to as pixels) from the primitives for further processing when the samples are covered by the primitive. Optionally, multiple samples for each pixel are taken within the primitives during the scan conversion operations 644, which may be used for anti-aliasing purposes. In certain implementations, different pixels may be sampled differently. For example, some edge pixels may contain a lower sampling density than center pixels to optimize certain aspects of the rendering for head mounted displays (HMDs). The fragments (or "pixels") generated from the primitives during scan conversion 644 may have parameter values that may be interpolated to the locations of the pixels from the vertex parameter values 639 of the vertices of the primitive that created them. The rasterization stage 640 may include parameter interpolation operations 646 stage to compute these interpolated fragment parameter values 649, which may be used as inputs for further processing at the later stages of the pipeline.

The pipeline 630 may include further pixel processing operations, indicated generally at 650 in FIG. 6B, to further manipulate the interpolated parameter values 649 and perform further operations determining how the fragments contribute to the final pixel values for display. Some of these pixel processing tasks may include pixel shading computations 652 that may be used to further manipulate the interpolated parameter values 649 of the fragments. The pixel shading computations may be performed by a programmable pixel shader, and pixel shader invocations 648 may be initiated based on the sampling of the primitives during the rasterization processing stages 640. The pixel shading computations 652 may output values to one or more buffers 605 in graphics memory 628, sometimes referred to as render targets, or if multiple, as multiple render targets (MRTs).

MRTs allow pixel shaders to optionally output to more than one render target, each with the same screen dimensions but potentially with a different pixel format. Render target format limitations often mean that any one render target can only accept up to four independent output values (channels) and that the formats of those four channels are tightly tied to each other. MRTs allow a single pixel shader to output many more values in a mix of different formats. The formats of render targets are "texture-like", in that they store values per screen space pixel, but, for various performance reasons, render target formats are becoming more specialized in recent hardware generations, sometimes (but not always) requiring what is called a "resolve" to reformat the data before it is compatible with being read in by the texture units.

The pixel processing 650 may generally culminate in render output operations 656, which may include what are commonly known as raster operations (ROP). Rasterization Operations (ROP) is simply run multiple times per pixel, once for each render target among the multiple render targets (MRTs). During the render output operations 656, the final pixel values 659 may be determined in a frame buffer, which may optionally include merging fragments, applying stencils, depth tests, and certain per sample processing tasks. The final pixel values 659 include the collected output to all active render targets (MRTs). The GPU 604 uses the final pixel values 659 to make up a finished frame 660, which may optionally be displayed on the pixels of the display device 616 in real-time.

The output operations 650 may also include texture mapping operations 654, which may be performed to some extent by one or more pixel shaders PS and to some extent by the texture units 606. The pixel shader computations 652 include calculating texture coordinates UV from screen space coordinates XY, and sending the texture coordinates to the Texture Operations 654, and receiving texture data TX. The texture coordinates UV could be calculated from the screen space coordinates XY in an arbitrary fashion, but typically are calculated from interpolated input values or sometimes from the results of previous texture operations. Gradients gr are often directly calculated from quads of texture coordinates by the texture units 606 (Texture Operations hardware units), but can optionally be calculated explicitly by the pixel shader computations 652 and passed to the texture operations 654 rather than relying on the texture units 606 to perform the default calculation.

The texture operations 654 generally include the following stages, which can be performed by some combination of a pixel shader PS and a texture unit 606. First, one or more texture coordinates UV per pixel location XY are generated and used to provide a coordinate set for each texture mapping operation. Then, texture space gradient values gr for pixel locations based on a non-orthonormal grid in screen space are generated. Finally, the texture space gradient values gr are modified by adjustment values trans to produce corrected texture space values Gr.

In some implementations, the pixel shader PS can generate the texture coordinates UV per pixel location XY and provide a coordinate set for each texture mapping operation to the texture unit 606, which may generate texture space gradient values gr and modify them to produce corrected texture space gradient values Gr.

In other implementations, the pixel shader PS could calculate the texture space coordinates UV and explicit differences gr from the pixel locations XY and pass the differences and texture space coordinates to the texture unit 606 (optionally with adjustment matrix trans) and indicate to the texture unit 606 that it must still correct the explicit differences gr by applying the transform trans to get the gradient values Gr.

In other alternative implementations, the pixel shader PS could calculate the texture space coordinates UV and explicit corrected gradients Gr and pass those to the texture unit, indicating to the texture unit 606 that any required transform using the matrix trans has already been applied in software and the corrected gradients Gr should be used as is to select the LOD.

Gradient Adjustment

Figure 2A:
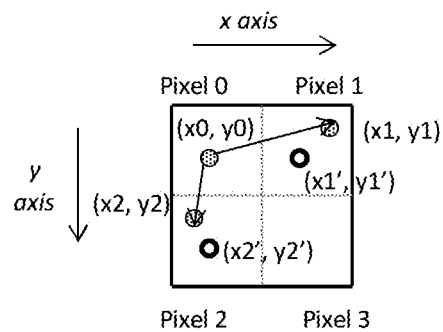
FIGS. 2A-2C depict gradient transformations in applying textures in accordance with aspects of the present disclosure.
Figure 2B:
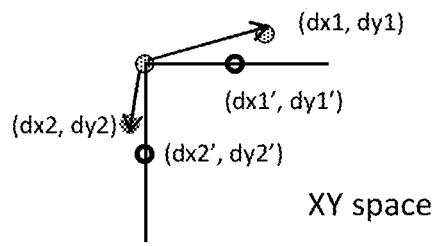
Figure 2C:
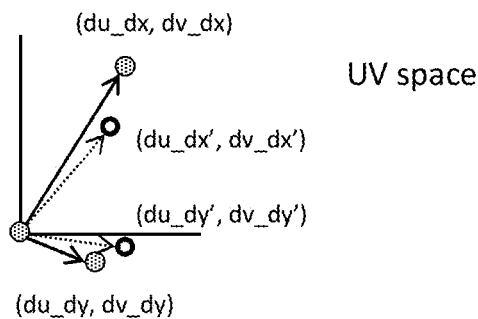

Aspects of the present disclosure are directed to adjustment of gradients gr used by the texture unit 606 to determine the mipmap level (LOD) for a texture to be applied to a primitive in the graphics pipeline. The basic concept is illustrated in FIGS. 2A-2C. FIG. 2A depicts four pixel samples in a "quad" in XY space. FIG. 2B depicts difference values Δxy in XY space dx1, dy1, dx2, dy2 that may be expressed mathematically in terms of the pixel sample locations in XY space of the upper left, upper right and lower left pixels, respectively (x0,y0), (x1,y1), and (x2,y2), as follows:

$$dx1=x1-x0$$

$$dy1=y1-y0$$

$$dx2=x2-x0$$

$$dy2=y2-y0$$

FIG. 2C depicts texture gradients gr in UV space that are computed from the texture coordinates UV. The texture gradients gr may be expressed mathematically in terms of the texture coordinates UV of the upper left, upper right and lower left pixels, respectively (u0,v0), (u1,v1) and (u2,v2), as follows:

$$du\_dx=u1-u0$$

$$dv\_dx=v1-v0$$

$$du\_dy=u2-u0$$

$$dv\_dy=v2-v0$$

These calculations of du_dx=u1−u0, etc. can be performed by the texture unit hardware 106 if the pixel shader PS does not choose to override them with software calculated values. The texture gradients gr are then used by the texture unit 606 to determine the mipmap LOD level to sample.

In this example, the location of the pixel at (x3,y3) and its corresponding texture coordinate UV is ignored for the purposes of calculating the gradients. In this example, it is assumed that the hardware works on quads of 2×2 pixels, but only needs one d_dx and d_dy gradient per texture coordinate to determine the mipmap LOD level to sample. Three pixels are sufficient to generate the gradients using the assumption that the values vary close to linearly. If the texture unit 606 uses this simplifying assumption it can discard the UV values from the lower right pixel sample (x3,y3). In some implementations, pixel shaders might choose to calculate gradients gr in software, if UV values vary non-linearly enough that taking into account the fourth sample's values would improve gradient calculations significantly.

With an ortho-normal set of pixel locations, i.e. dx1=1, dy1=0, dx2=0 and dy2=1, the texture gradients that comprise gr (du_dx, dv_dx, du_dy and dv_dy) may be used without modification. With a set of pixel locations that is not ortho-normal, it is desirable to generate corrected texture gradients Gr, comprised of the values du_dx', dv_dx', du_dy' and dv_dy'. These represent the value an approximation to the value that the gradient would take if the texture coordinates UV were generated at ortho-normal pixel sample locations (x0,y0), (x1',y1') and (x2',y2'), instead of the actual pixel sample locations (x0,y0), (x1,y1) and (x2,y2). A generalized transformation using the adjustment matrix trans between the texture gradients gr and the corrected texture gradients Gr may be expressed mathematically in terms of the difference values deltaxy of the XY space coordinates of the non-orthonormal pixel sample locations as follows:

$$D = dx1*dy2 - dx2*dy1$$

$$trans\_xx = dy2/D$$

$$trans\_xy = -dy1/D$$

$$trans\_yx = -dx2/D$$

$$trans\_yy = dx1/D$$

Here, trans_xx, trans_xy, trans_yx, and trans_yy are sometimes referred to as transformation coefficients.

Each texture coordinate gradient gr calculated by the texture unit or pixel shader based on assumed ortho-normal pixel locations can then be corrected by the texture unit by applying this transformation as follows:

$$du\_dx' = trans\_xx*du\_dx + trans\_xy*du\_dy$$

$$du\_dy' = trans\_yx*du\_dx + trans\_yy*du\_dy$$

And so on, for 2 or 3 texture coordinates, as required by the texture unit:

$$dv\_dx' = trans\_xx*dv\_dx + trans\_xy*dv\_dy$$

$$dv\_dy' = trans\_yx*dv\_dx + trans\_yy*dv\_dy$$

$$dw\_dx' = trans\_xx*dw\_dx + trans\_xy*dw\_dy$$

$$dw\_dy' = trans\_yx*dw\_dx + trans\_yy*dw\_dy$$

The calculation of the transformation matrix trans is typically performed outside of the GPU 604, e.g., by the CPU code $603_C$ running on the CPU 602, when setting up the pixel sample locations XY for a quad. For example, when configuring the hardware of the GPU 604 with a specific set of pixel sample locations or render target settings, the CPU code $603_C$ could also calculate the four matrix transform elements of a transformation matrix trans from the difference values dx1, dy1, dx2, dy2. By way of example, and not by way of limitation, the system 600 can also include special purpose hardware or software that calculates the transformation matrix trans.

Note that dx1, dy1, dx2, dy2 are constant over large areas of the screen that share the same repeating sample distribution, and so is the transformation matrix trans. For this reason it is useful to select between a palette of values based on screen location at the rasterization stage 640 of the graphics pipeline 630.

Temporal Anti-Aliasing

Gradient adjustment can be particularly useful in temporal anti-aliasing. Examples of this may be understood by referring to FIGS. 3A-3B, 4 and 5. In FIGS. 3A-3b, 4 and 5, pixels having color and depth values are indicated as grey circles. Pixels having only depth values are indicated as smaller black circles. In some implementations, graphics processing can be sped up by taking advantage of commonalties between successive frames to split the processing of an image between two frames with each frame being made up of alternating columns of pixels from the image.

In an alternating column temporal anti-aliasing configuration the GPU renders every other column of pixels in the image in one frame and then does a fill-in on the next frame. For example, as shown in FIG. 3A, frame 302 has color and depth samples on the left of each column and depth samples only on the right. In the next frame 304 this is reversed. The GPU only shades half the pixels in each frame. In some implementations, the pixels in the two frames 302, 304 may alternate in other configurations. Those skilled in the art will recognize that an alternating row configuration may be used in which rows of pixels with and without color samples alternate. In addition, as shown in FIG. 3B, the pixels in the two frames may alternate in a "checkerboard" fashion in which pixels with and without color samples alternate across the rows and along the columns as well. Again, the GPU only shades half the pixels in each frame.

The columns of pixels with color samples (gray circles) in frame 302 interleave with corresponding pixel columns in frame 304 in such a way that they form a single image 306. Analysis of the color and depth values of frames 302, 304, typically performed by the GPU using pixel shaders or compute shaders, allows full or partial use of the color values of frames 302 when filling in the gaps in frame 304 to form the single image 306. This can be particularly advantageous in that it reduces the number of pixels that need to be processed for each frame, thereby reducing the workload to render each frame. This type of rendering referred to herein as "reduced resolution rendering". In these temporal antialiasing cases, the idea is to render the frames as if each color sample was part of a higher resolution display.

The need to adjust the gradient in such temporal anti-aliasing can be understood with reference to FIGS. 4-5. Specifically, in the case shown in FIG. 3A, the gradient for quad 301 in frame 302 is calculated from the locations of the pixels at (x0,y0), (x1,y1), and (x2,y2) in XY space. Due to the configuration of the pixels in this frame, the grid is not an orthonormal grid. Instead, the grid has been "stretched" in the horizontal direction (or, equivalently, "squashed" in the vertical direction). This would distort the gradient components du_dx and dv_dx. To calculate corresponding UV space gradient components du_dx' and dv_dx' based on an orthonormal grid, it would be desirable if the pixel at (x1,y1) were located in the "empty" column at (x1',y1'). In this example, because of alternating pixel column configuration of the frames 302, 304 the UV space gradient components du_dy and dv_dy need not be adjusted and can be computed from the actual sample locations (x0,y0) and (x2,y2). Using the equations above, this results in a halving of the d_dx gradients:

$$dx1=2.0$$

$$dy1=0.0$$

$$dx2=0.0$$

$$dy2=1.0$$

$$D=(2.0)*(1.0)-(0.0)*(0.0)=2.0$$

$$trans\_xx=1.0/2.0=0.5$$

$$trans\_xy=-0.0/2.0=0.0$$

$$trans\_yx=-0.0/2.0=0.0$$

$$trans\_yy=2.0/2.0=1.0$$

$$du\_dx'=trans\_xx*du\_dx+trans\_xy*du\_dy=0.5*du\_dx$$

$$dv\_dx'=trans\_xx*dv\_dx+trans\_xy*dv\_dy=0.5*dv\_dx$$

$$du\_dy'=trans\_yx*du\_dx+trans\_yy*du\_dy=du\_dy$$

$$dv\_dy'=trans\_yx*dv\_dx+trans\_yy*dv\_dy=dv\_dy$$

In the "checkerboard" case shown in FIG. 3B the GPU would need to adjust both the horizontal and vertical components of the UV space gradient. For example, as shown in FIG. 5, it would be desirable to calculate the UV space gradients using points (x0,y0), (x1',y1') and (x0,y0), (x2',y2'). Using the equations above, this results in halving of the d_dx gradients and their subtraction from the d_dy gradients:

$$du\_dx'=0.5*du\_dx$$

$$dv\_dx'=0.5*dv\_dx$$

$$du\_dy'=du\_dy*0.5*du\_dx$$

$$dv\_dy'=dv\_dy-0.5*dv\_dx$$

Additional Aspects

An additional aspect of the present disclosure include a graphics processing method comprising: receiving or generating texture space gradient values for one or more primitives based on a non-orthonormal grid of sample points in a screen space and apply a transformation configured to generate corresponding ortho-normal texture space gradient values corrected for the non-orthonormality of the sample points in screen space and applying the transformation to the difference values between texture coordinate values to generate the gradient values.

Another additional aspect is a graphics processing system configured to implement the foregoing method.

Yet another additional aspect is a computer-readable medium having computer executable instructions embodied therein that, when executed, implement the foregoing method.

A further aspect is an electromagnetic or other signal carrying computer-readable instructions for performing the foregoing method.

A computer program product downloadable from a communication network and/or stored on a computer-readable and/or microprocessor-executable medium, characterized in that it comprises program code instructions for implementing the foregoing method.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A computer graphics method, comprising:
receiving or generating texture space gradient values for one or more primitives based on a non-orthonormal grid of sample points in a screen space with a texture unit of a graphics processing unit; and
applying a transformation to the texture space gradient values with the texture unit, wherein the transformation is configured to generate corresponding ortho-normal texture space gradient values corrected for the non-orthonormality of the sample points in screen space with the texture unit,
wherein the texture unit is configured to apply the transformation to difference values between texture coordinate values to generate the gradient values.

2. The method of claim 1, wherein the texture unit is an application specific integrated circuit (ASIC), field programmable gate array (FPGA), or system on chip (SOC).

3. The method of claim 1, wherein the non-orthonormal grid is an alternating column pattern.

4. The method of claim 1, wherein the non-orthonormal grid is an alternating row pattern.

5. The method of claim 1, wherein the non-orthonormal grid is "checkerboard" pattern.

6. The method of claim 1, wherein the adjustment factors include per-pixel modifications.

7. The method of claim 1, further comprising calculating corrective transformation from pixel sample location difference values with the texture unit.

8. The method of claim 1, further comprising using the gradient values to select a level of detail from a plurality of levels of detail for a texture to be applied to one or more primitives.

9. The method of claim 8, further comprising applying the texture to the one or more primitives.

10. The method of claim 9, further comprising displaying images that include the texture applied to the one or more primitives with a display unit coupled to the GPU.

11. A non-transitory computer-readable medium having computer executable instructions embodied therein that, when executed, implement a method for graphics processing, the method comprising:
receiving or generating texture space gradient values for one or more primitives based on a non-orthonormal grid of sample points in a screen space with a texture unit of a graphics processing unit; and
applying a transformation to the texture space gradient values with the texture unit, wherein the transformation is configured to generate corresponding ortho-normal texture space gradient values corrected for the non-orthonormality of the sample points in screen space with the texture unit, wherein the texture unit is configured to apply the transformation to difference values between texture coordinate values to generate the gradient values.

12. The non-transitory computer-readable medium of claim 11, wherein the non-orthonormal grid is an alternating column pattern.

13. The non-transitory computer-readable medium of claim 11, wherein the non-orthonormal grid is an alternating row pattern.

14. The non-transitory computer-readable medium of claim 11, wherein the non-orthonormal grid is "checkerboard" pattern.

15. The non-transitory computer-readable medium of claim 11, wherein the adjustment factors include per-pixel modifications.

16. The non-transitory computer-readable medium of claim 11, further comprising calculating corrective transformation from pixel sample location difference values with the texture unit.

17. The non-transitory computer-readable medium of claim 11, further comprising using the gradient values to select a level of detail from a plurality of levels of detail for a texture to be applied to one or more primitives.

18. The non-transitory computer-readable medium of claim 17, further comprising applying the texture to the one or more primitives.

19. The non-transitory computer-readable medium of claim 18, further comprising displaying images that include the texture applied to the one or more primitives with a display unit coupled to the GPU.

* * * * *